April 8, 1924.
A. E. BURTCHAELL
CONVEYER
Filed July 24, 1923
1,489,926
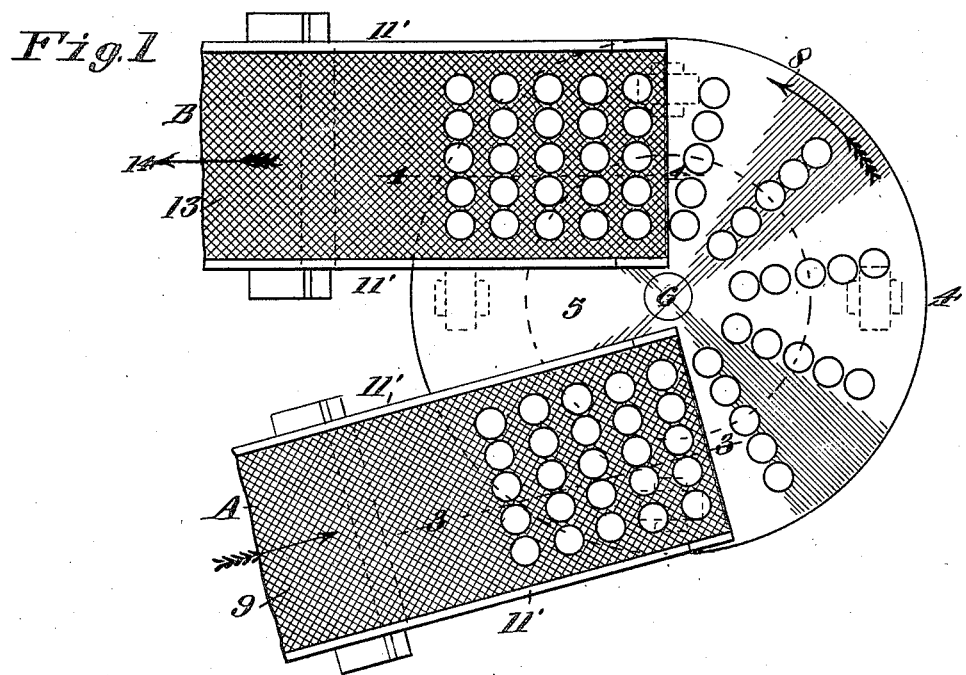
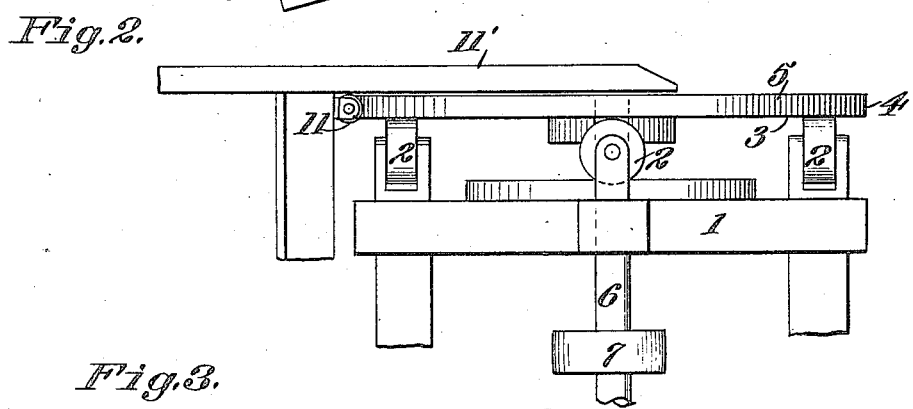
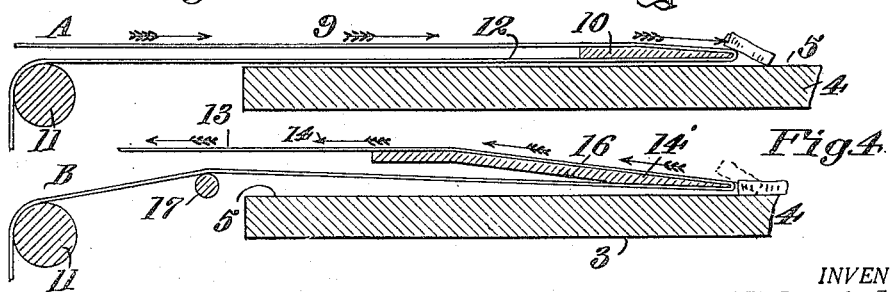
INVENTOR.
A. E. Burtchaell,
BY
ATTORNEYS.

Patented Apr. 8, 1924.

1,489,926

UNITED STATES PATENT OFFICE.

ARTHUR E. BURTCHAELL, OF SAN FRANCISCO, CALIFORNIA.

CONVEYER.

Application filed July 24, 1923. Serial No. 653,475.

*To all whom it may concern:*

Be it known that I, ARTHUR E. BURTCHAELL, citizen of the United States, residing in the city and county of San Francisco and State of California, have invented certain new and useful Improvements in Conveyers, of which the following is a specification.

The present invention relates to improvements in a conveying apparatus designed particularly for use in connection with various types of conveying apparatuses disposed with the conveyer runs in communicating relation with each other and at an angle to each other. By my present invention I am enabled to provide a continuous travel of material on belt conveyers in an enclosure in which it is impossible to dispose the belt conveyers in a single straight line and by my invention I am enabled to transfer from the discharge end of one conveyer onto the receiving end of a cooperating conveyer the material in the same manner and same arrangement as it is conveyed by the feed conveyer, thus if it is disposed in rows on the feed conveyer it will be transferred onto the discharge conveyer in similar rows.

My invention consists primarily in providing a rotatable transfer member preferably in the form of a turntable, the upper surface of which is common to the cooperating end of two adjacent conveyers the surfaces of which are arranged in a plane immediately above the plane of the transfer member or turntable. My invention further consists in operating the transfer member or turntable at a speed slightly greater than that of the feed conveyer and at a speed slightly less than that of the discharge conveyer whereby the articles to be transferred are removed from the end of the feed conveyer, are conveyed to the receiving end of the discharge conveyer by the transfer member, and due to the accelerated speed of the discharge conveyer over that of the transfer member are removed from the upper surface of the transfer member by the discharge conveyer.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention reference is directed to the accompanying drawings wherein—

Fig. 1 is a view in top plan of a pair of conveyers of the endless belt type disposed with their runs in angular relation and illustrating a rotatable transfer member in cooperative relation with the corresponding ends of said conveyers.

Fig. 2 is a view in side elevation of the embodiment illustrated in Fig. 1.

Fig. 3 is a longitudinal sectional view taken on the line 3—3 of Fig. 1 and

Fig. 4 is a similar view taken on the line 4—4 of Fig. 1.

In the drawings wherein like characters of reference designate corresponding parts throughout the several views of the drawings, 1 indicates a suitable frame carrying on its upper surface anti-friction rollers 2 on which rest the under surface 3 of a transfer member 4 the receiving surface 5 of which is disposed in a horizontal plane. The transfer member 4 is preferably of disk formation resembling a turntable and from the center of which depends a shaft 6 carrying a power wheel 7 adapted to be driven by any suitable mechanism to rotate a transfer member in the direction of the arrow 8, Fig. 1.

Discharging onto the upper surface of the transfer member 5 is the discharge end of a feed conveyer A preferably of the belt type and the belt 9 forming said conveyer at a point overlying the upper surface of the transfer member operates over a guide 10 carried by the conveyer side frame members 11' and disposed a very slight distance above the upper surface of the member 5. The belt 9 after passing around said conveyor guide operates over a roller 11, the lower flight 12 of the belt being disposed substantially parallel with the upper surface of the transfer member 5. It will be observed that the guide 10 is arranged radially of the transfer member as in Fig. 1.

At the opposite side of the axis of rotation of the transfer member 5 is arranged the discharge conveyer B which is also of the belt type and the belt 13 of which operates in the direction of the arrows 14 and at its pick up or receiving end passes around the forward edge 14 of a conveyer guide, the surface of which is inclined upwardly from the upper surface of the member 5 as at 16. Like the feed conveyer, the conveyer B operates over supporting rollers 17 to maintain the same taut. The respective rollers 17 and 11 may be driven by any suitable mechanism to operate the respective belts 9 and 13 in the directions of the arrows and at different speeds from each other and the speed of the belt A being less than the speed of travel of the transfer member 4, with the speed of the belt B greater than the speed of travel of the transfer member.

In operation it will be observed that a row of articles on the belt 9 approaching the edge of the conveyer guide 10 will tip from the discharge end of the conveyer A and be picked up by the accelerated speed of the transfer member 5, thus the transfer member due to its increase of speed over that of the feed conveyer A, removes the members from the discharge end of the belt of the conveyer A. The rotation of the member 5 in the direction of the arrow conveys articles to the receiving end of the conveyer B and as soon as the forward end of the article contacts with the forward edge 14′ of the belt of the conveyer B the accelerated speed of said belt over the speed of the transfer member 5 will lift the forward edge of the article from the surface of the belt and assist in depositing the transferred article onto the belt of the conveyer B and the articles so deposited on the belt will be disposed in the same manner as they were disposed on the conveyer A prior to being discharged therefrom and conveyed by the transfer member.

Having thus described my invention what I claim as new and desire to protect by Letters Patent of the United States is:—

1. In combination, a pair of endless traveling belt conveyers operating in a substantially horizontal plane, with their ends lying in spaced relation, a rotatable transfer member operating in a substantially horizontal plane immediately below the plane of operation of said endless conveyers and common to both, for receiving material from the discharge of one of said endless conveyers and for transferring the same onto the receiving end of the other of said endless conveyers, said latter conveyer moving at a speed greater than that of the transfer member.

2. In combination, a pair of endless traveling belt conveyers, one disposed with its discharge end adjacent to the receiving end of the other, a rotatable transfer member positioned in a plane below the upper surfaces of said ends of said conveyers and common to both for receiving material from the discharge end of one of said conveyers and for transferring the same onto the receiving end of the other of said endless conveyers, said transfer member moving at a speed less than that of the last mentioned conveyer.

3. In combination, a pair of endless traveling belt conveyers arranged in angular relation to each other, one disposed with its discharge end in spaced relation to and adjacent to the receiving end of the other, a transfer member rotatably mounted beneath the adjacent ends of said conveyers and common to both for receiving material from the discharge end of one of said endless conveyers and for conveying the same to the receiving end of the other of said endless conveyers, said latter conveyer traveling at a speed greater than that of the transfer member for removing transferred material from said transfer member as the same is presented to the receiving end of said conveyer.

4. In combination, a pair of endless traveling belt conveyers arranged in angular relation, one disposed with its discharge end adjacent to and in spaced relation to the receiving end of the other, a rotatable transfer member disposed immediately beneath the adjacent ends of said endless conveyers and common to both for receiving material from the discharge end of one of said conveyers and for conveying the same to the forward end of the other of said endless conveyers, said transfer member moving at a greater rate of speed than the conveyer from which it receives material and at a lesser rate of speed than the conveyer to which it transfers said received material.

In testimony whereof I have signed my name to this specification.

ARTHUR E. BURTCHAELL.